(12) United States Patent
Lee et al.

(10) Patent No.: US 10,844,844 B2
(45) Date of Patent: Nov. 24, 2020

(54) CARBON BLADE FOR WIND POWER GENERATOR WITH MULTI-DOWN CONDUCTOR

(71) Applicant: DOOSAN HEAVY INDUSTRIES & CONSTRUCTION CO., LTD., Changwon-si (KR)

(72) Inventors: Sang Il Lee, Yongin-si (KR); Jeong Hoon Lee, Daejeon (KR); In Gyu Oh, Yongin-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 0 days.

(21) Appl. No.: 16/067,126

(22) PCT Filed: Nov. 8, 2017

(86) PCT No.: PCT/KR2017/012632
§ 371 (c)(1),
(2) Date: Jun. 29, 2018

(87) PCT Pub. No.: WO2018/101632
PCT Pub. Date: Jun. 7, 2018

(65) Prior Publication Data
US 2020/0271104 A1    Aug. 27, 2020

(30) Foreign Application Priority Data
Nov. 30, 2016    (KR) .......................... 10-2016-0161646

(51) Int. Cl.
*F03D 80/30*    (2016.01)
*F03D 1/06*    (2006.01)

(52) U.S. Cl.
CPC .......... *F03D 80/30* (2016.05); *F03D 1/0675* (2013.01); *F05B 2240/21* (2013.01); *F05B 2240/30* (2013.01); *F05B 2280/2006* (2013.01)

(58) Field of Classification Search
CPC ....................................... F03D 80/30
See application file for complete search history.

(56) References Cited

U.S. PATENT DOCUMENTS 6,457,943 B1 * 10/2002 Olsen .................... F03D 1/0675
244/1 A
6,612,810 B1 * 9/2003 Olsen ...................... F03D 80/30
416/95

(Continued)

FOREIGN PATENT DOCUMENTS

EP    2267280 A2    12/2010
EP    2461029 A2    6/2012

(Continued)

OTHER PUBLICATIONS

A Korean Office Action dated Aug. 26, 2018 in connection with Korean Patent Application No. 10-2016-0161646.

*Primary Examiner* — Michael Lebentritt
*Assistant Examiner* — Topaz L. Elliott
(74) *Attorney, Agent, or Firm* — Invenstone Patent, LLC

(57) ABSTRACT

The disclosure relates to a carbon blade for a wind turbine with multiple down conductors, and more particularly, to a carbon blade for a wind turbine with multiple down conductors that includes multiple down conductors disposed thereon to reduce or prevent a potential difference between a plurality of points to be formed thereon from being generated.

17 Claims, 8 Drawing Sheets

(56) References Cited

U.S. PATENT DOCUMENTS

| | | | |
|---|---|---|---|
| 8,118,559 B2* | 2/2012 | Llorente Gonzalez | F03D 1/065 416/226 |
| 8,342,805 B2* | 1/2013 | Mendez Hernandez | F01D 11/00 416/146 R |
| 8,497,423 B2* | 7/2013 | Blumer | F03D 13/20 174/36 |
| 9,157,419 B2* | 10/2015 | Lewke | F03D 80/30 |
| 2010/0329881 A1* | 12/2010 | Mendez Hernandez | B64D 45/02 416/230 |
| 2012/0043108 A1* | 2/2012 | Blumer | H01B 7/043 174/107 |
| 2012/0100002 A1* | 4/2012 | Kawasetsu | F03D 1/0675 416/229 R |
| 2013/0149153 A1* | 6/2013 | Fujioka | H02G 13/00 416/146 R |
| 2014/0348654 A1* | 11/2014 | Klein | F03D 80/40 416/95 |
| 2015/0377217 A1* | 12/2015 | Sandercock | F03D 80/30 416/230 |
| 2016/0327028 A1* | 11/2016 | March Nomen | F03D 80/30 |
| 2017/0122295 A1* | 5/2017 | Klein | F03D 1/0675 |
| 2017/0145988 A1* | 5/2017 | March Nomen | F03D 1/0675 |

FOREIGN PATENT DOCUMENTS

| | | | |
|---|---|---|---|
| EP | 2623773 A2 | 8/2013 | |
| EP | 2631478 A1 | 8/2013 | |
| JP | 2004-515712 A | 5/2004 | |
| JP | 2010-223148 A | 10/2010 | |
| KR | 10-2010-0115139 A | 10/2010 | |
| KR | 10-2012-0120195 A | 11/2012 | |
| KR | 10-2013-0084612 A | 7/2013 | |
| KR | 10-2013-0093529 A | 8/2013 | |
| KR | 10-2013-0093530 A | 8/2013 | |
| WO | WO-2011080177 A1 * | 7/2011 | F03D 80/30 |
| WO | 2013/007267 A1 | 1/2013 | |
| WO | WO-2018095649 A1 * | 5/2018 | F03D 80/30 |

* cited by examiner

[Fig.1]
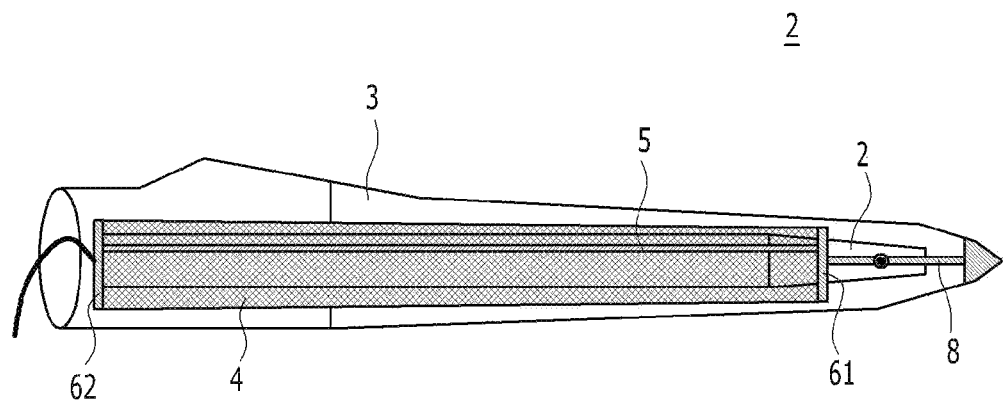

[Fig.2a]
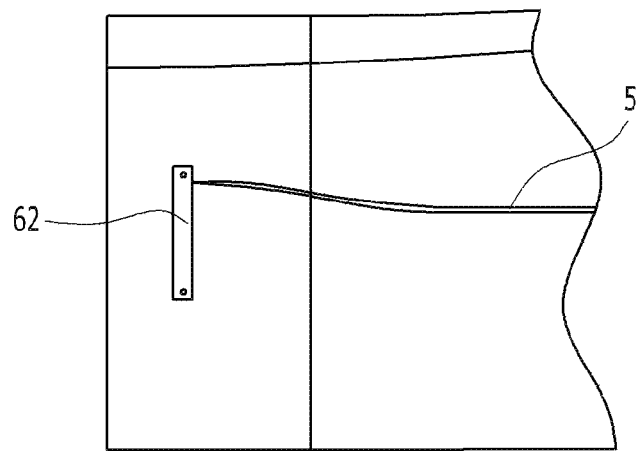

【Fig.2b】
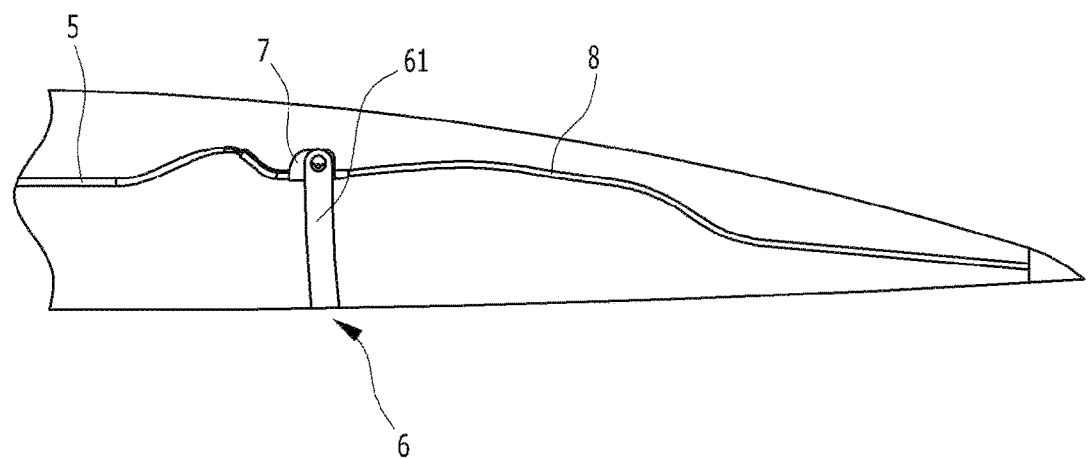

[Fig.3]
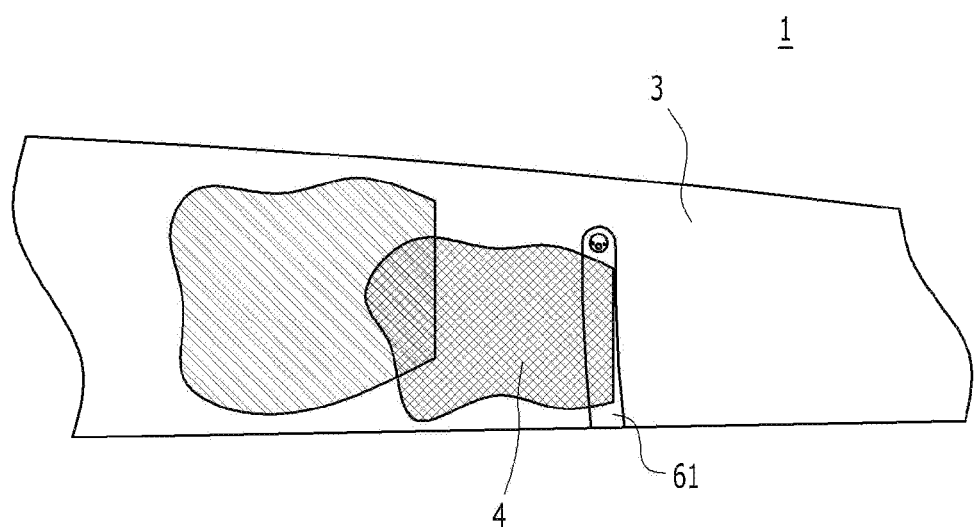

[Fig.4]
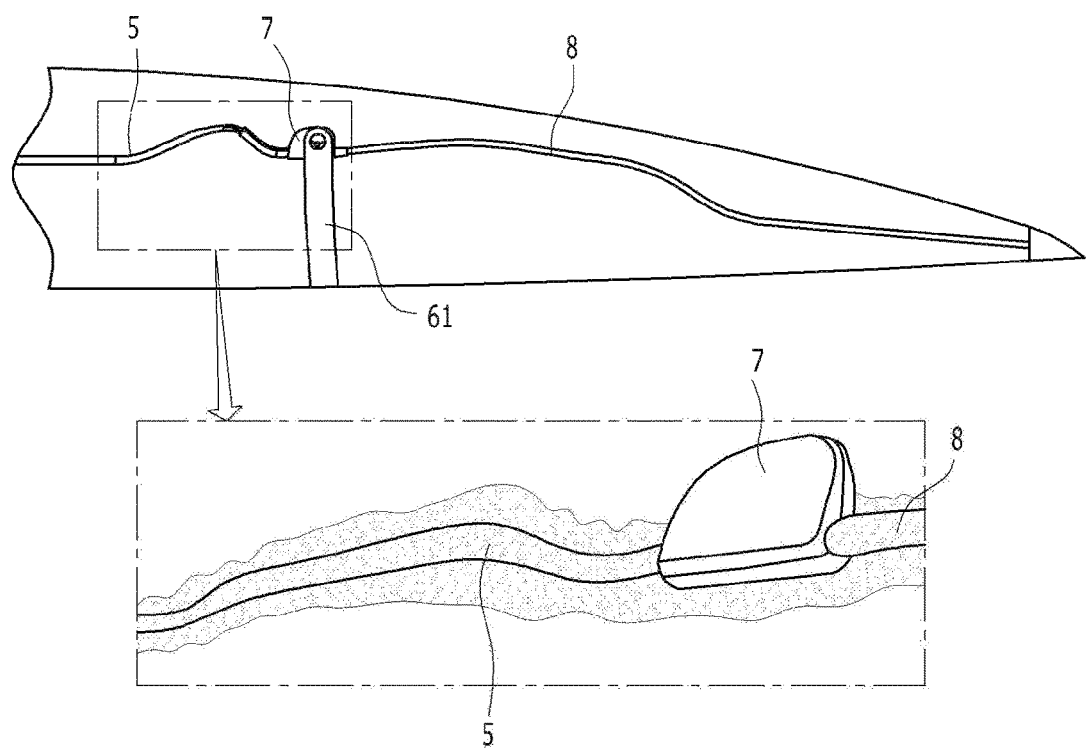

[Fig.5]
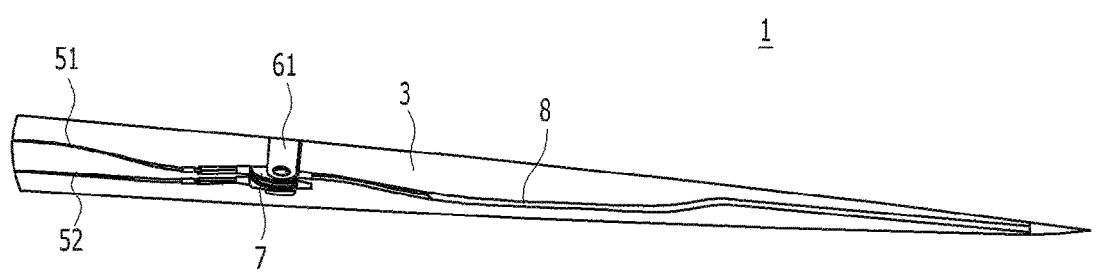

【Fig.6】
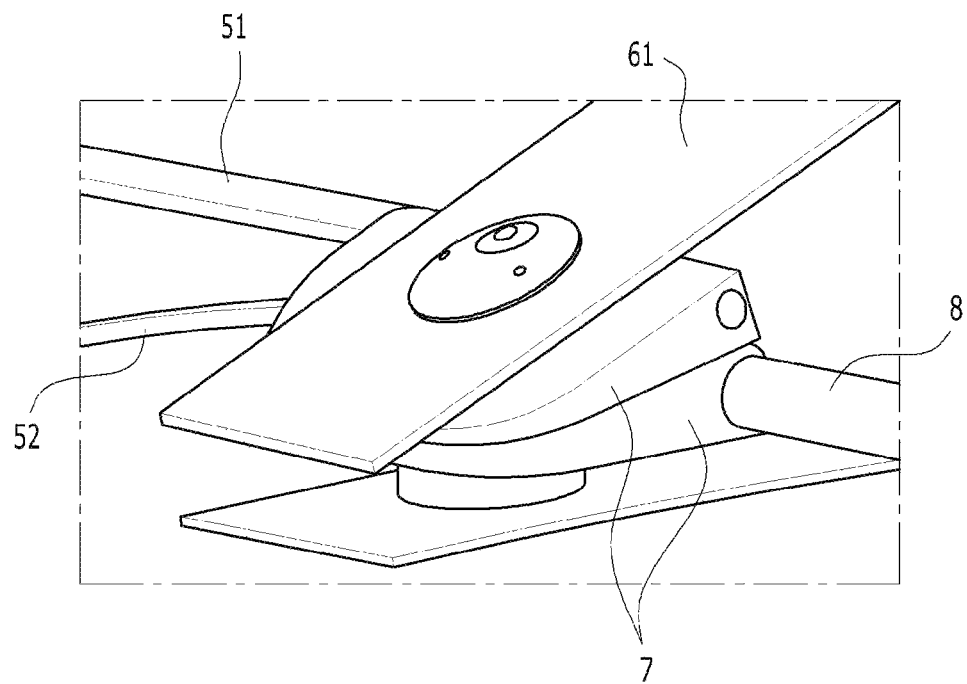

[Fig.7]
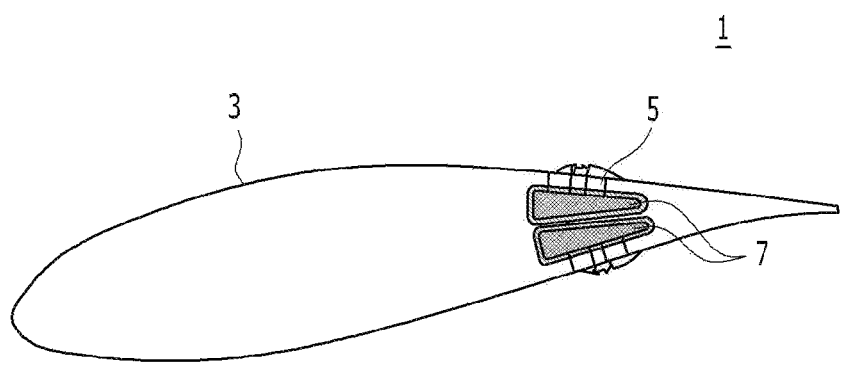

CARBON BLADE FOR WIND POWER GENERATOR WITH MULTI-DOWN CONDUCTOR

CROSS-REFERENCE TO RELATED APPLICATIONS

This application is a national stage of International Application No. PCT/KR2017/012632, filed 8 Nov. 2017, which claims the benefit of priority to Korean Application No. 10-2016-0161646, filed 30 Nov. 2016 in the Korean Intellectual Property Office, the disclosures of which are incorporated herein by reference.

TECHNICAL FIELD

The disclosure relates to a carbon blade for a wind turbine with multiple down conductors, and more particularly, to a carbon blade for a wind turbine with multiple down conductors that is configured to have the multiple down conductors disposed thereon to prevent a potential difference between a plurality of points to be formed thereon from being generated.

BACKGROUND ART

A wind turbine drives a generator disposed at the inside thereof with wind energy and thus to produce electric power form the wind energy.

Generally, the wind turbine includes the generator and a plurality of blades disposed on the upper portion of a vertically erected tower structure.

In this case, the wind turbine with the blades is typically located on the field or sea surface where the wind blows well, which undesirably causes frequent lightning damage.

Down conductors may be disposed on the blades of the wind turbine in such a manner as to come into contact with the ground.

In this case, however, the down conductors are spaced apart from each other by a given distance, so that when they receive lightning, a high internal voltage difference is generated to undesirably cause flashover.

In the case in which only one down conductor is disposed, however, if the down conductor is damaged to undesirably cause grounding to fail, lightning damages may be generated on the skin of the blade.

PRIOR ART DOCUMENT

Patent Document

U.S. Pat. No. 8,342,805

DISCLOSURE

Technical Problem

Accordingly, the disclosure has been made in view of the above-mentioned problems occurring in the prior art, and it is an object of the disclosure to provide a carbon blade for a wind turbine that is configured wherein down conductors are disposed on the outer and inner surfaces thereof, respectively, in such a manner as to be bonded to each other on both ends of the carbon blade, thereby enabling an equipotential bonding structure to be easily formed on the carbon blade.

It is another object of the disclosure to provide a carbon blade for a wind turbine that is configured wherein even if a down conductor disposed on the outer surface of the carbon blade is damaged, the function of the damaged down conductor is replaced with a down conductor disposed on the inner surface of the carbon blade, thereby minimizing the damages caused by lightning.

It is yet another object of the disclosure to provide a carbon blade for a wind turbine that is configured wherein a plurality of down conductor is disposed in parallel with each other on the outer and inner surfaces of the carbon blade, thereby offsetting the magnetic fields generated from the plurality of down conductors.

Technical Solution

The present disclosure relates to a carbon blade for a wind turbine with multiple down conductors, and more particularly, to a carbon blade for a wind turbine with multiple down conductors that limits or prevents a potential difference between a plurality of points thereon from being generated.

In an example, a carbon blade for a wind turbine, including: a carbon spar cap located at the center of the width thereof in such a manner as to be extended in a longitudinal direction thereof; a carbon skin disposed extended from a tip to a root thereof to cover the outer surface thereof; a first down conductor located on the surface thereof in such a manner as to partially cover the carbon spar cap in parallel with the carbon spar cap; and a second down conductor located on the inner surface thereof in such a manner as to al low both ends thereof to be connected to the first down conductor by means of a coupling member.

The first down conductor may be made of an aluminum mesh.

The second down conductor may be made of a wire woven with a conductor.

The conductor may be made of copper.

The coupling member may include a tip coupling member and a root coupling member disposed on both ends of the first down conductor and the second down conductor, and the tip coupling member and the root coupling member being adapted to connect the first down conductor and the second down conductor with each other to allow the potentials of the first down conductor and the second down conductor to be same as each other.

The first down conductor and the second down conductor may be disposed in parallel with each other.

The carbon blade may further include a block member disposed on one side of the inner surface of the carbon blade to fix the second down conductor to the inner surface of the carbon blade.

The block member may be fixed by means of a bolt connecting the coupling member, the first down conductor disposed on the surface of the carbon blade, the carbon blade, and the second down conductor.

The carbon blade may further include a tip down conductor having one end disposed on the tip portion of the carbon blade in such a manner as to be extended to the tip coupling member.

The second down conductor may include a front down conductor and a rear down conductor disposed on the front and rear sides of the inner surface of the carbon blade in such a manner as to be extended from the tip coupling member to the root coupling member.

The tip down conductor may be made of a wire woven with a conductor.

The conductor of the wire of the tip down conductor may be made of copper.

Advantageous Effects

According to the disclosure, the carbon blade for a wind turbine is configured wherein the down conductors are disposed on the outer and inner surfaces thereof in such a manner as to be bonded to each other on both ends of the surface of the carbon blade, thereby enabling an equipotential bonding structure to be easily formed on the surface of the carbon blade.

Further, even if the down conductor disposed on the outer surface of the carbon blade is damaged, the function of the damaged down conductor is replaced with the down conductor disposed on the inner surface of the carbon blade, thereby minimizing the damages caused by lightning.

In addition, the plurality of down conductor is disposed in parallel with each other on the outer and inner surfaces of the carbon blade, thereby offsetting the magnetic fields generated from the plurality of down conductors.

DESCRIPTION OF DRAWINGS

FIG. 1 is a front view showing a carbon blade fora wind turbine with multiple down conductors according to a first embodiment of the disclosure.

FIG. 2a is a front view showing a root coupling member of the carbon blade for a wind turbine with multiple down conductors according to the first embodiment of the disclosure.

FIG. 2b is a front view showing a tip coupling member of the carbon blade for a wind turbine with multiple down conductors according to the first embodiment of the disclosure.

FIG. 3 is a partially front view showing the carbon blade for a wind turbine with multiple down conductors according to the first embodiment of the disclosure.

FIG. 4 is an enlarged view showing the tip coupling member of the carbon blade for a wind turbine with multiple down conductors according to the first embodiment of the disclosure.

FIG. 5 is a front sectional view showing the tip side of the carbon blade for a wind turbine with multiple down conductors according to a second embodiment of the disclosure.

FIG. 6 is a perspective view showing the block members and tip coupling member of the carbon blade for a wind turbine with multiple down conductors according to the second embodiment of the disclosure.

FIG. 7 is a longitudinal sectional view showing the block members and tip coupling member of the carbon blade for a wind turbine with multiple down conductors according to the second embodiment of the disclosure.

MODE FOR INVENTION

Hereinafter, an explanation of a carbon blade for a wind turbine with multiple down conductors according to the disclosure will be in detail given with reference to the attached drawings. In the description, it should be noted that the parts corresponding to those of the drawings are indicated by corresponding reference numerals. Terms, such as the first, the second, A, B, (a), and (b) may be used to describe various elements, but the elements are not restricted by the terms. The terms are used to only distinguish one element from the other element. For example, a first element may be named a second element without departing from the scope of the disclosure. When it is said that one element is described as being "connected" or "coupled" to the other element, one element may be directly connected or coupled to the other element, but it should be understood that another element may be present between the two elements.

An exemplary object of the disclosure is to provide a carbon blade for a wind turbine in which down conductors are disposed on the outer and inner surfaces thereof, respectively, in such a manner as to be bonded to each other on both ends of the carbon blade, thereby enabling an equipotential bonding structure to be easily formed on the carbon blade.

Another exemplary object of the disclosure is to provide a carbon blade for a wind turbine in which even if a down conductor disposed on the outer surface of the carbon blade is damaged, the function of the damaged down conductor is replaced with a down conductor disposed on the inner surface of the carbon blade, thereby reducing or minimizing the damage caused by lightning.

Yet another exemplary object of the disclosure is to provide a carbon blade for a wind turbine in which a plurality of down conductors are disposed in parallel with each other on the outer and inner surfaces of the carbon blade, thereby offsetting the magnetic fields generated from the plurality of down conductors.

FIG. 1 is a front view showing a carbon blade fora wind turbine with multiple down conductors according to a first embodiment of the disclosure.

Referring to FIG. 1, the detailed configuration of a carbon blade for a wind turbine according to the disclosure and a lightning and flashover reduction device disposed on the carbon blade will be discussed.

In more detail, a carbon blade 1 for a wind turbine according to the disclosure includes a carbon spar cap 2 located at the center of the width thereof in such a manner as to be extended in a longitudinal direction thereof, a carbon skin 3 extending from a tip to a root thereof to cover the outer surface thereof, a first down conductor 4 located on the surface thereof in such a manner as to partially cover the carbon spar cap 2 in parallel with the carbon spar cap 2, and a second down conductor 5 located on the inner surface thereof in such a manner as to allow both ends thereof to be connected to the first down conductor 4 by a coupling member 6.

Preferably, the first down conductor 4 is made of an aluminum mesh, and the second down conductor 5 is made of a wire woven with a conductor.

The conductor may be made of copper.

In more detail, the carbon skin 3 of the carbon blade 1 maybe made of carbon fibers that cover over the entire area thereof. The carbon spar cap 2 is located at the center of the width thereof in such a manner as to be extended in the longitudinal direction thereof.

The first down conductor 4, which may be made of aluminum mesh, may cover the entire surface of the carbon spar cap 2 except the tip portion thereof in such a manner as to be linearly extended in the longitudinal direction of the carbon blade.

Further, the second down conductor 5 is located at the inner surface of the carbon blade corresponding to the top surface of the carbon blade on which the first down conductor 4 is located, while occupying a smaller area than the area occupied by the first down conductor 4.

The second down conductor 5 may be made of wire woven with a conductor.

Preferably, the conductor is made of copper.

Further, the carbon blade 1 for a wind turbine according to the disclosure may be provided in the form of a straight line.

A coupling member 6 is located on both ends of the first down conductor 4 and the second down conductor 5, respectively, in such a manner as to allow both ends thereof to connect the first down conductor 4 and the second down conductor 5 disposed on the outer and inner surfaces of the carbon blade to offset a potential difference existing between the first down conductor 4 and the second down conductor 5.

The coupling member 6 includes a tip coupling member 61 and a root coupling member 62 respectively disposed on both ends of the first down conductor 4 and the second down conductor 5, and as mentioned above, the coupling member 6 serves to connect the first down conductor 4 and the second down conductor 5 with each other and to allow the potentials of the first down conductor 4 and the second down conductor 5 to be same as each other.

To do this, the first down conductor 4 and the second down conductor 5 may be coupled in parallel with each other to one carbon blade, and accordingly, two or more equipotential bonding points are provided.

Further, the first down conductor 4 and the second down conductor 5 may be disposed in parallel with each other.

In the case where the first down conductor 4 and the second down conductor 5 place the surface of the carbon blade therebetween, their parallel arrangement enables the magnetic field generated from one side down conductor to be offset by the magnetic field generated from the other side down conductor disposed on the opposite side to one side down conductor.

If there are no down conductors disposed in parallel with each other, a magnetic field may be generated from an installed down conductor, thereby causing an undesirable influence on the carbon spar cap or carbon skin adjacent to the down conductor. Accordingly, it is preferable that the first down conductor 4 and the second down conductor 5 are disposed in parallel with each other, with the surface of the carbon blade arranged therebetween.

FIG. 2a is a front view showing the root coupling member of the carbon blade for a wind turbine with multiple down conductors according to the first embodiment of the disclosure.

FIG. 2b is a front view showing the tip coupling member of the carbon blade for a wind turbine with multiple down conductors according to the first embodiment of the disclosure.

Referring to FIGS. 2a and 2b, the first down conductor 4 and the second down conductor 5 are respectively disposed on the tip and root portions of the carbon blade and the coupling members fix both ends of the first down conductor 4 and the second down conductor 5 thereto.

In more detail, a current flow like lightning transmitted to the tip portion of the carbon blade is transmitted to the first down conductor 4 and is also transmitted to the second down conductor 5 along a tip down conductor 8.

When the first down conductor 4 and the second down conductor 5 receive the current flow like lightning, they come into contact with each other on the tip coupling member 61 to set the same potentials as each other and transmit the current to the root portion of the carbon blade.

The first down conductor 4 and the second down conductor 5 come into contact with each other on the root coupling member 62 to form an equipotential so that no potential difference is generated.

In this process, the tip coupling member 61 and the root coupling member 62 connect the first down conductor 4 and the second down conductor 5 with each other through a block member 7.

FIG. 3 is a partial front view showing the carbon blade for a wind turbine with multiple down conductors according to the first embodiment of the disclosure.

Referring to FIG. 3, the first down conductor 4 and the second down conductor 5 are disposed on the tip and root portions of the carbon blade and the coupling members fix both ends of the first down conductor 4 and the second down conductor 5 thereto.

In more detail, a current flow like lightning transmitted to the tip portion of the carbon blade is transmitted to the first down conductor 4 and is also transmitted to the second down conductor 5 along the tip down conductor 8.

FIG. 4 is an enlarged view showing the tip coupling member of the carbon blade for a wind turbine with multiple down conductors according to the first embodiment of the disclosure.

Referring to FIG. 4, the first down conductor 4 and the second down conductor 5 are disposed on the tip portion of the carbon blade and the coupling members fix both ends of the first down conductor 4 and the second down conductor 5 thereto.

In more detail, the block member 7 is disposed on one side of the inner surface of the carbon blade to fix the second down conductor 5 to the inner surface of the carbon blade.

A current flow like lightning transmitted to the tip portion of the carbon blade is transmitted to the first down conductor 4 and is also transmitted to the second down conductor 5 along the tip down conductor 8.

When the first down conductor 4 and the second down conductor 5 receive the current flow like lightning, they come into contact with each other on the tip coupling member 61 to set the same potentials as each other and transmit the current to the root portion of the carbon blade.

The first down conductor 4 and the second down conductor 5 come into contact with each other on the root coupling member 62 to form an equipotential so that no potential difference is generated.

In this process, the tip coupling member 61 and the root coupling member 62 connect the first down conductor 4 and the second down conductor 5 with each other through the block member 7.

Further, desirably, the block member 7 is fixed by means of a bolt connecting the tip coupling member 61, the first down conductor 4 disposed on the surface of the carbon blade, the carbon blade, and the second down conductor 5.

Furthermore, the tip down conductor 8 has one end disposed on the tip port ion of the carbon blade and is extended to the tip coupling member 61.

FIG. 5 is a front sectional view showing the tip side of the carbon blade for a wind turbine with multiple down conductors according to a second embodiment of the disclosure.

FIG. 6 is a perspective view showing the block members and tip coupling member of the carbon blade for a wind turbine with multiple down conductors according to the second embodiment of the disclosure.

Referring to FIGS. 5 and 6, the first down conductor 4 and the second down conductor 5 are disposed on the tip portion of the carbon blade and the coupling members fix both ends of the first down conductor 4 and the second down conductor 5 thereto.

The second down conductor 5 includes a front down conductor 51 and a rear down conductor 52 disposed on the front and rear sides of the inner surface of the carbon blade in such a manner as to be extended from the tip coupling member 61 to the root coupling member 62.

Also, the tip down conductor 8 may be made of a wire woven with a conductor.

The conductor may be made of copper.

As mentioned above, the second down conductor 5 includes the front down conductor 51 and the rear down conductor 52 disposed on the front and rear sides of the inner surface of the carbon blade in such a manner as to be extended from the tip coupling member 61 to the root coupling member 62.

The second down conductor 5 is divided into the front down conductor 51 and the rear down conductor 52 so that a current can be dividedly transmitted to the front and rear sides of the carbon blade, thereby protecting the carbon blade from lightning in a more stable manner.

Accordingly, the plurality of down conductors is coupled to the carbon blade so that even if the down conductor disposed on the outer surface of the carbon blade is damaged, the function of the damaged down conductor is replaced with the down conductor disposed on the inner surface of the carbon blade.

FIG. 7 is a longitudinal sectional view showing the block members and tip coupling member of the carbon blade for a wind turbine with multiple down conductors according to the second embodiment of the disclosure.

Referring to FIG. 7, block members 7 are disposed on the front and rear sides of the inner surface of the carbon blade to fix the second down conductor 5 thereto.

While the disclosure has been described with reference to particular illustrative embodiments, it should be understood that they have been presented by way of example only and the disclosure is not restricted by the embodiments. It is to be appreciated that those skilled in the art can change or modify the embodiments without departing from the scope and spirit of the disclosure. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

The disclosure may be modified in various ways and may have several exemplary embodiments. Specific exemplary embodiments of the disclosure are illustrated in the drawings and described in detail in the detailed description. However, this does not limit the disclosure within specific embodiments and it should be understood that the disclosure covers all the modifications, equivalents, and replacements within the idea and technical scope of the disclosure.

The invention claimed is:

1. A carbon blade for a wind turbine, the carbon blade comprising:
    a carbon skin covering a surface of the blade and extending from a tip of the blade to a root of the blade;
    a carbon spar cap that is disposed at the center of a width of the blade and extends in a longitudinal direction of the blade, the carbon spar cap including a first portion disposed toward the root of the blade and a second portion disposed toward the tip of the blade;
    a first down conductor that is installed on an outer side of the surface of the blade and extends in parallel with the carbon spar cap;
    a second down conductor installed on an inner side of the surface of the blade such that the surface of the blade is disposed between the first down conductor and the second down conductor; and
    a coupling member that electrically connects the first down conductor and the second down conductor in order to provide at least two equipotential bonding points on each of the first down conductor and the second down conductor,
    wherein the first down conductor has one end covering the first portion of the carbon spar cap while exposing the second portion of the carbon spar cap.

2. The carbon blade according to claim 1, wherein the first down conductor includes an aluminum mesh.

3. The carbon blade according to claim 1, wherein the second down conductor includes a wire woven with a conductor.

4. The carbon blade according to claim 1, wherein
    the coupling member includes a tip coupling member and a root coupling member,
    the tip coupling member is disposed at first ends of the first down conductor and the second down conductor,
    the root coupling member is disposed at second ends of the first down conductor and the second down conductor, and
    the tip coupling member and the root coupling member respectively connect the first down conductor and the second down conductor with each other.

5. The carbon blade according to claim 4, further comprising a tip down conductor having one end disposed on the tip portion of the carbon blade and extending to the tip coupling member.

6. The carbon blade according to claim 5, wherein the tip down conductor includes a wire woven with a conductor.

7. The carbon blade according to claim 5, further comprising:
    a block member disposed on the inner side of the surface of the carbon blade to fix the second down conductor to the carbon blade,
    wherein the block member is fixed by a bolt operable to simultaneously connect the coupling member, the first down conductor, the carbon blade, the second down conductor, and the tip down conductor.

8. The carbon blade according to claim 4, wherein
    the second down conductor includes a front down conductor and a rear down conductor,
    the front down conductor is disposed on a first side of the inner side of the surface of the carbon blade,
    the rear down conductor is disposed on a second side of the inner side of the surface of the carbon blade, and
    the front and rear down conductors extend from the tip coupling member to the root coupling member.

9. The carbon blade according to claim 8, further comprising:
    a tip down conductor having one end disposed on the tip portion of the carbon blade and extending to the tip coupling member; and
    a block member disposed on the inner side of the surface of the carbon blade to fix the second down conductor to the carbon blade,
    wherein the block member is fixed by a bolt operable to simultaneously connect the coupling member, the first down conductor, the carbon blade, the front down conductor, the rear down conductor, and the tip down conductor.

10. The carbon blade according to claim 1, wherein the first down conductor and the second down conductor are disposed in parallel with each other.

11. The carbon blade according to claim 1, further comprising a block member disposed on the inner side of the surface of the carbon blade to fix the second down conductor to the carbon blade.

12. The carbon blade according to claim 11, wherein the block member is fixed by a bolt operable to connect the coupling member, the first down conductor, the carbon blade, and the second down conductor.

13. A method for protecting a carbon blade from damage, the carbon blade comprising a carbon skin covering a surface of the blade and extending from a tip of the blade to a root of the blade, and a carbon spar cap that is disposed at the center of a width of the blade and extends in a longitudinal direction of the blade, the carbon spar cap including a first portion disposed toward the root of the blade and a second portion disposed toward the tip of the blade, the method comprising:
 coupling the carbon skin and a plurality of down conductors to the carbon blade, the plurality of down conductors including:
  a first down conductor that is installed on an outer side of the surface of the blade and extends in parallel with the carbon spar cap; and
  a second down conductor installed on an inner side of the surface of the blade such that the surface of the blade is disposed between the first down conductor and the second down conductor,
 wherein the first down conductor has one end covering the first portion of the carbon spar cap while exposing the second portion of the carbon spar cap;
 applying a voltage to the carbon blade;
 maintaining a similar voltage between the plurality of down conductors to reduce or avoid flashover; and
 maintaining a current path through the plurality of down conductors if one of the down conductors is damaged.

14. The method according to claim 13, wherein the coupling step includes coupling the plurality of down conductors in parallel with each other in such a manner as to have at least two equipotential bonding points.

15. The method according to claim 13, wherein the applying the voltage step includes a voltage applied by the generation of an instant potential difference through an external cause.

16. The method according to claim 13, wherein the maintaining the similar voltage step includes:
 offsetting a voltage difference between the outer side and the inner side of the surface of the carbon blade using two or more of the plurality of down conductors,
 wherein magnetic fields generated from the two or more down conductors are offset by each other.

17. The method according to claim 13, wherein the maintaining the current path step includes replacing the function of the damaged down conductor with a down conductor disposed on the inner side of the surface of the carbon blade.

* * * * *